United States Patent [19]

Olkoski et al.

[11] Patent Number: 5,673,314
[45] Date of Patent: Sep. 30, 1997

[54] ELECTRONIC DEVICE WITH DOOR COVER SPEAKER ACTUATOR AND LATCH MECHANISM

[75] Inventors: Jill C. Olkoski, Ft. Lauderdale; Tyler D. Jensen, Sunrise; Julio C. Castaneda, Coral Springs; Gordon Wayne James, Plantation; Wille Kotte, Miami; William D. Werner, Coral Springs; Larry E. Marvet, Plantation; Roger G. Higgins, Sunrise; Steven Jay Finch, Plantation; Benjamin J. Hafen, Sunrise; William R. Williams, Coral Springs; Joseph Patino, Pembroke Pines; Kok Huat Chong, Sunrise, all of Fla.

[73] Assignee: Motorola, Inc., Schaumburg, Ill.

[21] Appl. No.: 498,445

[22] Filed: Sep. 18, 1995

[51] Int. Cl.[6] .................................................. H04M 1/00
[52] U.S. Cl. .......................... 379/433; 379/434; 379/420
[58] Field of Search .................................... 379/433, 428, 379/434, 429, 420; 455/89, 90, 128

[56] References Cited

U.S. PATENT DOCUMENTS

| 5,278,993 | 1/1994 | Reiff et la. | 455/90 |
| 5,316,168 | 5/1994 | Finch et al. | 220/341 |
| 5,499,292 | 3/1996 | Blonder et al. | 379/428 |

*Primary Examiner*—Jack K. Chiang
*Attorney, Agent, or Firm*—Andrew S. Fuller

[57] ABSTRACT

An electronic device (100) includes an attached door cover (150) having a speaker (160) with an integral speaker magnet (165) that is used as an actuator for a magnetically enable switch (130) positioned within the housing (115) of the electronic device (100). The door cover (150) is movable between a first position adjacent to the housing (115), and a second position having at least a portion of the door cover (150) away from the housing (115) and the switch (130) is actuated magnetically by the speaker magnet (165) when the door cover (150) is in the first position. Preferably, the speaker magnet (165) helps to latch the door cover (150) closed. Additionally, the door cover (150) is preferably detachable from the housing (115) of the electronic device (100) and is user replaceable.

8 Claims, 4 Drawing Sheets

ELECTRONIC DEVICE WITH DOOR COVER SPEAKER ACTUATOR AND LATCH MECHANISM

TECHNICAL FIELD

This invention relates in general to electronic deuces with audio outputs, and more specifically, to electronic deuces using door covers to provide access to expanded features.

BACKGROUND OF THE INVENTION

Electronic devices using door cover assemblies to cover device controls have become popular in recent years. Increasingly seen on video cameras, stereo equipment, and personal electronic devices, the door covers serve to protect device controls from accidental engagement, and also often serve to provide a smaller and more attractive electronic device package. For similar reasons, this concept has been gaining popularity in the design of hand-held communications devices. Existing applications include cordless telephones, and portable cellular radio telephones, which use a folding arrangement to allow these devices to be more compact. In some of these devices, the door cover "flips" open to active the device, and also functions as a mouthpiece for the user. Other functionality can also be built into the door cover ("flip door").

A typical prior art device employing the use of a flip door to activate or deactivate some function on the electronic device ordinarily includes a mechanical or magnetically activated switch embedded in the main body of the device housing, and activated by a corresponding member on the flip door. For example, in U.S. Pat. No. 5,278,993 issued on Jan. 11, 1994, to Reiff et al., for an Integral Spring Loaded Hinge And Switch For Portable Radio Device, a mechanically activated switch is formed in the housing and flap of the electronic apparatus. In another example, a discrete magnet is placed in the flip door of an electronic device, which magnet activates a hall effect switch or a reed switch, when the magnet is brought close to the switch, such as when the flip door is in a closed position. In the first example, the mechanical switch requires contact between two elements. One skilled in the art would appreciate the problems inherent in the use of mechanical switches. In the second example, an additional discrete element, i.e., the magnet, is typically assembled into the flip door to activate the switch. Generally, there is additional weight, cost, and size, associated with the magnet.

With the constant demand for ever smaller electronic device packages, every element which can be eliminated from the package represents potential weight, size, and cost savings. Devices employing flip doors provide certain aesthetic and functional advantages. It is desirable to have such a device while minimizing the additional parts needed to provide switch activation to enable various functions on such a device. Moreover, it is desirable to use existing parts to provide additional functionality within the electronic device.

DETAILED DESCRIPTION OF THE PREFERRED EMBODIMENT

Generally, the present invention provides for an electronic device with a door cover, sometimes referred to as a flip door, with a speaker mounted therein for audio output. The speaker has an integral speaker magnet, that in one embodiment, activates a magnetic switch situated within the body of the electronic device. The door cover is attached to the housing of the main body of the electronic device, and is movable or pivotable between a closed position, which is adjacent to the housing, and an open position which is away from the housing. The switch is activated when the door cover moves from an open position to a closed position, or vice versa. In a preferred embodiment, the speaker magnet also acts to latch the door cover, when the door cover is in the closed position, by magnetic attraction between the speaker magnet and a magnet attracting material, such as a ferrous plate, mechanically coupled to the housing. In another embodiment, the flip door containing the speaker is detachable and replaceable by a user.

Figure 1:
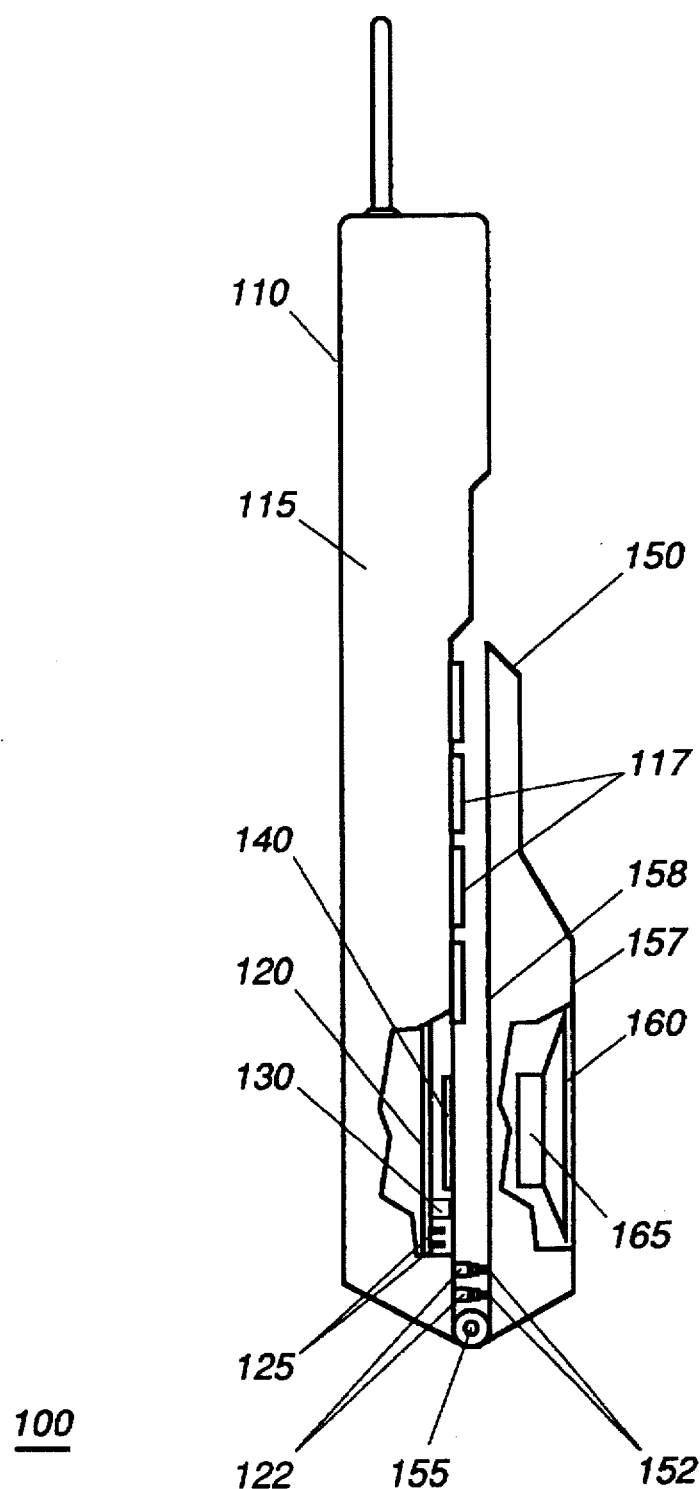
FIG. 1 is a fragmentary side view of a two-way communication electronic device, in accordance with the present invention.
Figure 2:
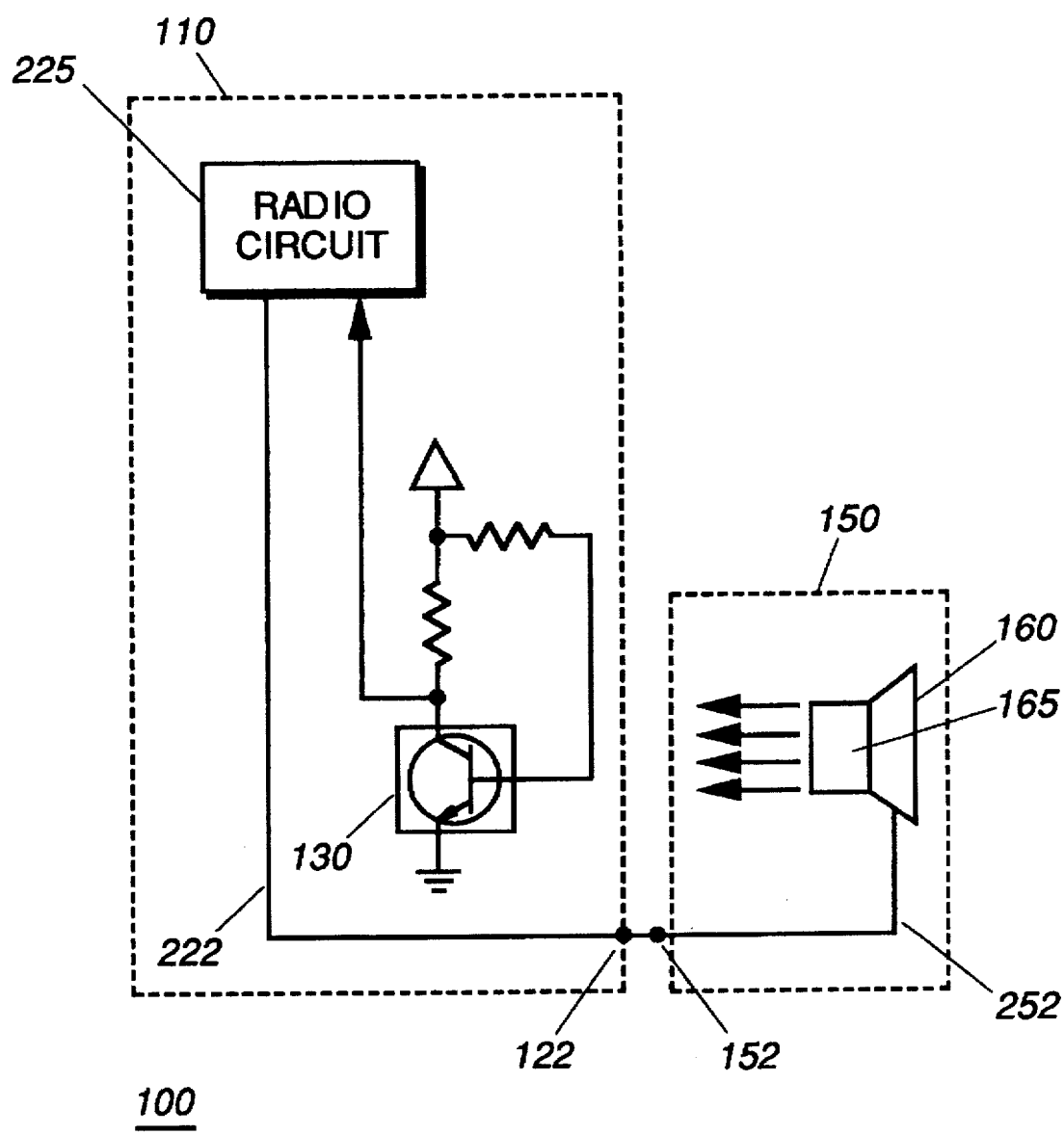
FIG. 2 is an electrical block diagram highlighting the switch mechanism of the communication device of FIG. 1, in accordance with the present invention.
Figure 3:
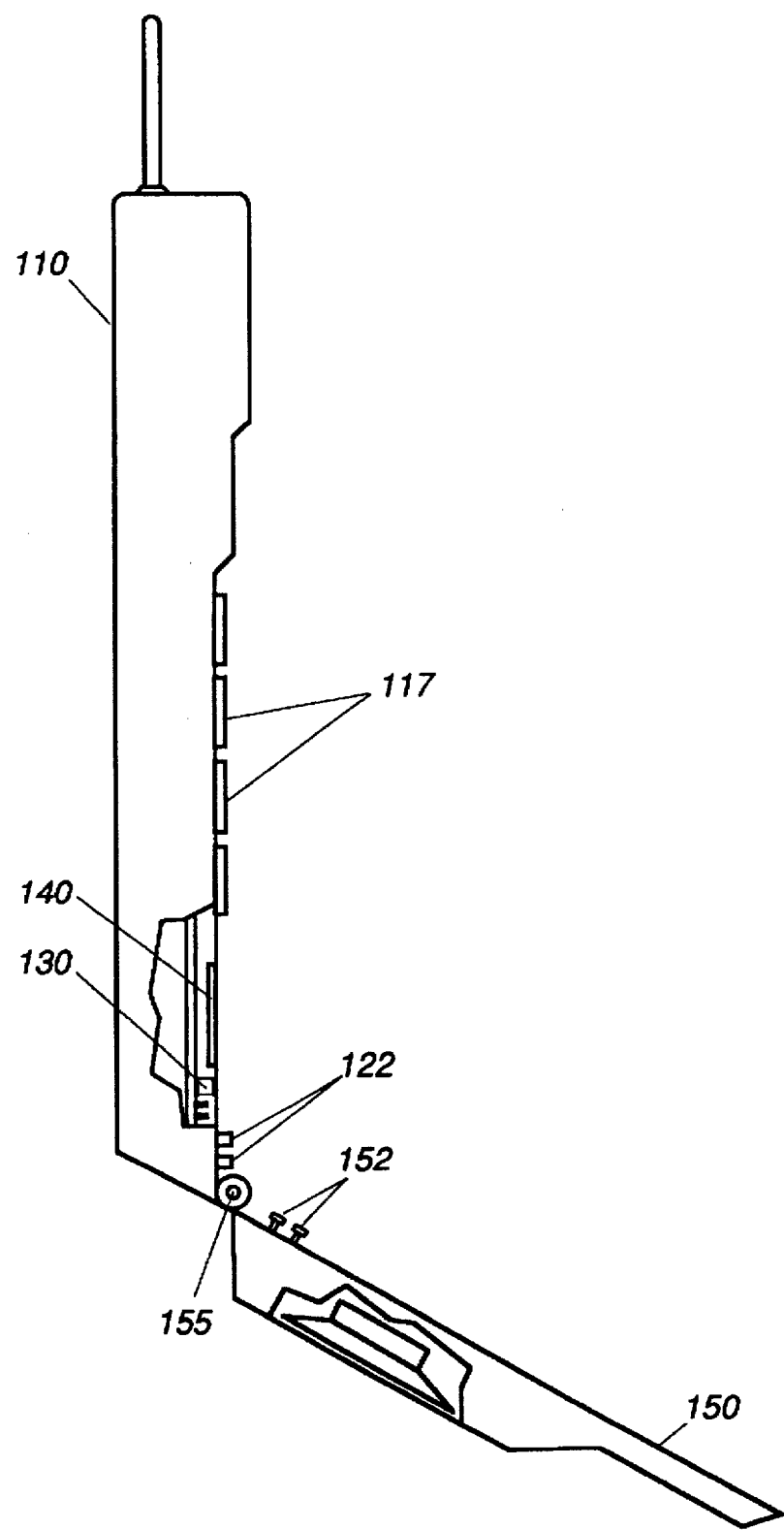
FIG. 3 is a fragmentary view of the communication device of FIG. 1 shown in an open position, in accordance with the present invention.

FIG. 1 is a fragmentary side view of an electronic device or assembly 100 shown in a first orientation, in accordance with the present invention. FIG. 2 is a block diagram of the electronic device 100 highlighting the interaction between the speaker magnet and the magnetically enabled switch, in accordance with the present invention. FIG. 3 is a fragmentary side view of the electronic device shown in a second orientation, in accordance with the present invention. Referring to FIGS. 1, 2, and 3, the electronic device is a two-way radio having communications circuitry for communicating over a radio frequency (RF) link in a well known manner. The radio 100 comprises a main body portion 110, and a door cover or flip door 150. A housing 115, encases or carries electronic circuitry 125, 130 mounted on a circuit carrying substrate, such as a printed circuit board 120. Device controls 117 provide controlled access to various features of the communication device implemented by the electronic circuitry 125, 130 and other radio circuitry 225.

The circuitry 125, 130 includes a magnetically enabled or actuated switch 130. The magnetically enabled switch is preferably a hall effect switch, which is activated when a magnetic field is brought in close proximity to the switch. These types of switches are well known in the art. Other magnetically enabled switches, such as reed switch or the like, could be substituted for the hail effect switch, while still employing the concepts of the present invention. Preferably, the housing 115 of the main body 110 also includes a magnet attracting material, such as a ferrous plate 140, mechanically coupled or attached thereto.

The door cover 150 is attached to the housing 115 via a hinge 155, and is selectively movable or pivotable between a closed position or first orientation adjacent to the main body 110 (see FIG. 1), and an open position or second orientation in which at least a portion of the door cover 150 is away from the housing 115 of the main body 110 (see FIG. 3). The door cover 150, among other functions, provides protection for the device controls when in the closed position. The door cover 150 has a speaker 160 mounted therein which provides selective audio output for the electronic device 100. Audio signals from the main portion 110 are routed via electrical contacts 122 mechanically coupled or mounted to the housing 115, and corresponding electrical contacts 152 mechanically coupled or mounted to the door cover 150. The speaker 160 is mounted within the door cover 150 and oriented to direct sound waves through the front 157 of the door cover. The speaker 160 has an integral speaker magnet 165 oriented toward the rear portion 158 of the door cover, i.e., the portion closest to the body of the main unit 110 when the door cover is in a closed position, as shown in FIG. 1.

A significant aspect of the present invention is the use of the speaker magnet of the speaker 160 mounted within the door cover 150, to perform multiple roles in the operation of the electronic device 100. Preferably, the speaker magnet 165 is used to activate the magnetic switch 130 to enable a particular operation mode of the radio 100. In the preferred embodiment, the radio 100 is operable in a dispatch mode when the door cover is in the closed position and the magnetic switch 130 enabled, and in a telephone interconnect mode when the door cover 150 is in an open position. When in dispatch mode, the signal contacts 122, 152 are interfaced such that the speaker 160 is electrically coupled to the radio circuit 225, and audio signals are routed via signal lines 222 from radio circuit 225, and signal line 252 which connects to the speaker 160.

Preferably, the speaker magnet 165 also provides a latching function, when the door cover 150 is in the closed position. Here, the speaker magnet 165 is located in close proximity with the ferrous plate 140 of the housing, which attracts the speaker magnet 165 to latch the door cover 150. Thus, the door cover 150 is secured in place by magnet attraction between the speaker magnet 165 and the ferrous plate 140. When the door cover 150 is moved or pivoted away from the body of the main housing 110, and placed in an open position, the speaker magnet 165 is located away from the ferrous plate 140 and the magnetically enabled switch 130. In the preferred embodiment, movement of the door cover 150 to the open position also disengages the electrical speaker contacts 152, situated on the door cover, from contacts 122 situated on the main body 110. This causes the speaker 160 to be electrically decoupled from the radio circuit 225 so that the speaker 160 is effectively disabled. Movement of the door cover 150 to the open position also removes the speaker magnet 165 from being adjacent to the magnetically enabled switch 130, thereby placing the radio 100 in a different operational mode, such as in low audio output mode in the preferred embodiment. Opening the door cover 150 also exposes the device control buttons 117 for access by an operator.

Figure 4:
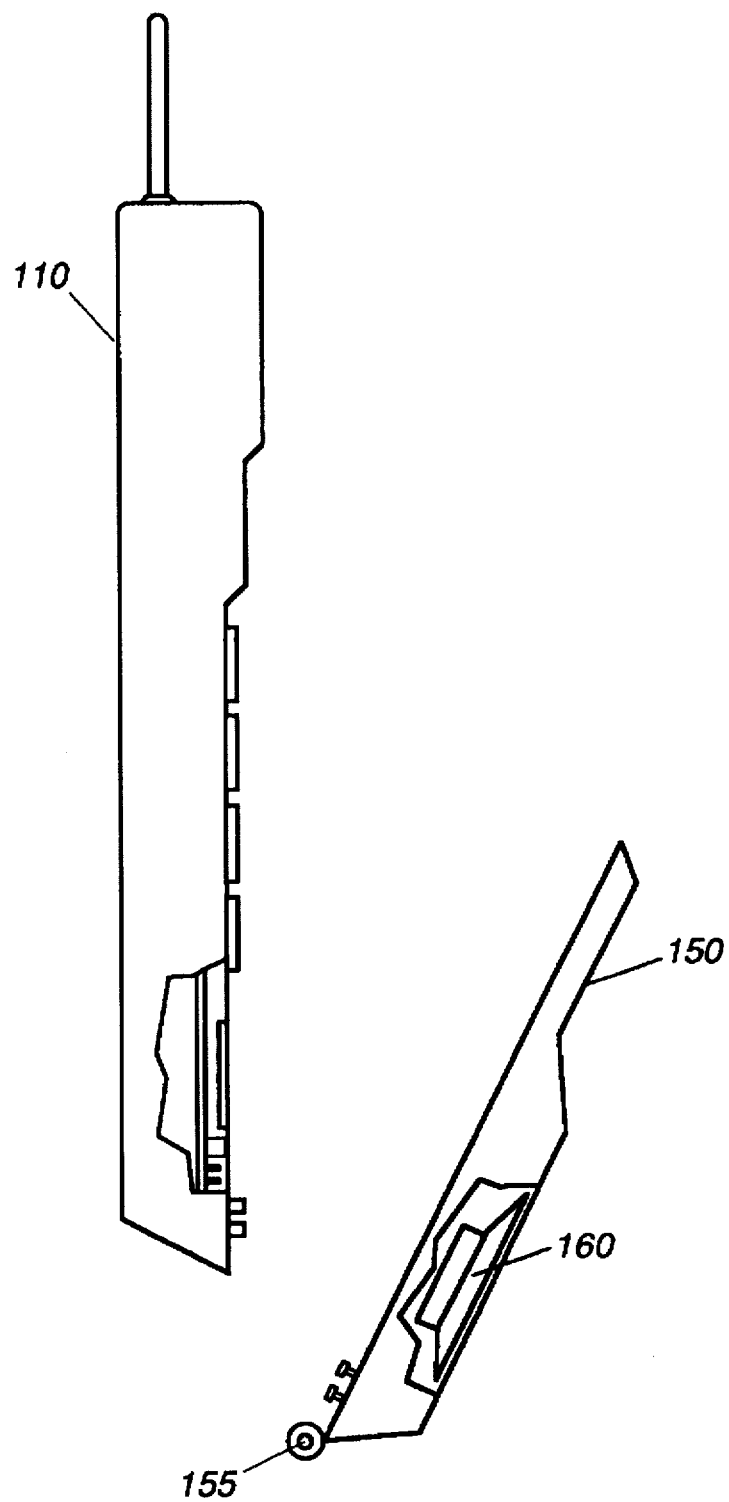
FIG. 4 is a fragmentary side view of the electronic device of FIG. 1, highlighting the detachable aspect of the door cover, in accordance with the present invention.

In another embodiment, the door cover is detachable from the housing via a detachable hinge, and replaceable by a user. Referring to FIG. 4, the electronic device 100 is shown with the door cover 150 and hinge 155 detached therefrom, in accordance with the present invention. Preferably, the hinge 155 is formed such that it is easily detachable by a user for repair or replacement. Many such detachable hinge schemes are known in the art. The detachable door cover and hinge mechanism of the preferred embodiment is formed as described in U.S. Pat. No. 5,316,168, issued on May 31, 1994, to Finch et al., for a Door Cover Assembly, and the subject matter contained therein is hereby incorporated by reference. Accordingly, the door cover 150 is detachable from the housing 115, without substantial damage, when a force exceeding a threshold value is applied to the hinge 155. The speaker contacts 122, 152 located on the door cover 150 and on the main body 110 facilitates such attachment and replacement of the door cover 150.

The present invention provides significant benefits over configurations known in the art. By locating the speaker within the door cover, an easily replaceable speaker mechanism is provided. The speaker magnet within the door cover is used as a switch actuator. Thus, a separate discrete magnet, such as typically used to enable magnetic switches, is obviated. Further, use the speaker magnet as a latch mechanism to secure the door cover in a closed position may eliminate the need for a separate latching mechanism. Furthermore, a radio configuration in which a high audio speaker is located within the flip door of a communication device is particularly useful for communication devices having switchable high and low audio modes.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, the speaker magnet sensed by the magnetically enabled switch could be located in other devices, such as radio accessory devices and the like, and could actuate operational modes within the radio when the speaker magnet in such a device is brought in close proximity to the radio.

What is claimed is:

1. A two-way communication device with a door cover speaker actuator, comprising:

a housing carrying electronic circuitry including a magnetically enabled switch, and carrying a plurality of device control buttons;

a door cover attached to the housing, and being movable between a closed position adjacent to the housing, and an open position having at least a portion of the door cover away from the housing, wherein when in the closed position, the door cover covers and provides protection for the device control buttons; and a speaker mounted within the door cover, the speaker having an integral speaker magnet;

wherein the switch is actuated magnetically by the speaker magnet when the door cover is in the closed position.

2. The communication device of claim 1, wherein the switch comprises a hall effect switch.

3. The communication device of claim 3, wherein the speaker is electrically coupled to the electronic circuitry such that the speaker is enable when the door cover is in the closed position, and the speaker is electrically decoupled from the electronic circuitry such that the speaker is disabled when the door cover is in the open position.

4. The communication device of claim 3, wherein the magnet attracting material comprises a ferrous plate that is attached to the housing.

5. The communication device of claim 3, wherein the speaker is electrically coupled to the electronic circuitry such that the speaker is enabled when the door cover is in the closed position, and is the speaker electrically decoupled from the electronic circuitry such that the speaker is disabled when the door cover is in the open position.

6. The communication device of claim 5, further comprising:

a first electrical contact mechanically coupled to the door cover and electrically coupled to the speaker; and a second electrical contact mechanically coupled to the housing and electrically coupled to the electronic circuitry;

wherein the first electrical contact interfaces with the second electrical contact when the door cover is in the closed position, and the first electrical contact is separated from the second electrical contact when the door cover is in the open position.

7. The communication device of claim 5, further comprising a hinge coupling the door cover to the housing, and wherein the door cover is detachable from the housing, without substantial damage, when a force exceeding a threshold value is applied to the hinge.

8. A two-way communication device comprising:

a housing carrying electronic circuitry including a magnetically actuated switch, and having device control buttons for operating the communication device;

a magnet attracting material mounted within the housing;

a door cover attached to the housing, and being pivotable between a first position adjacent to the housing, and a second position having at least a portion of the door cover away from the housing, wherein when in the first position, the door cover covers and provides protection for the device control buttons;

a speaker mounted within the door cover, the speaker having an integral speaker magnet;

wherein when the door cover is in the first position:

the door cover covers the device control buttons;

the speaker magnet actuates the switch; and the door cover is secured in place by magnetic attraction between the speaker magnet and the magnet attracting material.

\* \* \* \* \*